United States Patent [19]

Dreyfus et al.

[11] 4,236,179

[45] Nov. 25, 1980

[54] VERSATILE MICROSECOND MULTIPLE FRAMING CAMERA

[75] Inventors: Russell W. Dreyfus, Mount Kisco; Alfred J. Landon, Peekskill, both of N.Y.

[73] Assignee: International Business Machines Corporation, Armonk, N.Y.

[21] Appl. No.: 53,570

[22] Filed: Jun. 29, 1979

[51] Int. Cl.³ ............................................. H04N 7/18
[52] U.S. Cl. .................................... 358/93; 354/129; 358/217; 358/225; 455/608
[58] Field of Search .................. 358/93, 217, 225; 354/129; 455/608

[56] References Cited

U.S. PATENT DOCUMENTS

| | | | |
|---|---|---|---|
| 3,445,167 | 5/1969 | Armstrong | 356/432 |
| 3,485,159 | 12/1969 | McCall | 352/84 |
| 3,643,568 | 2/1972 | Guillet | 250/330 |

Primary Examiner—Howard W. Britton
Attorney, Agent, or Firm—Pollock, Vande Sande & Priddy

[57] ABSTRACT

A versatile microsecond multiple framing camera generates a switched beam of illumination derived from a laser and switched by an acousto-optic modulator. The illumination is focused on a subject, and illumination from the subject is caused to scan over a predetermined field by a mechanical or electromechanical scanner. Located in the field is an image recording device for recording the illumination directed over the field by the scanner. The image recording device, in one embodiment, includes a vidicon tube, for short term storage, and a video recorder for longer term storage. A video monitor may be driven from the video recorder. The versatility of the camera is exemplified by the ability to vary exposure times or frame rates by adjusting operator controls which drive the acousto-optic modulator and/or the electromechanical scanner. In other embodiments, the vidicon tube and video recorder can be replaced or supplemented by photographic film.

12 Claims, 7 Drawing Figures

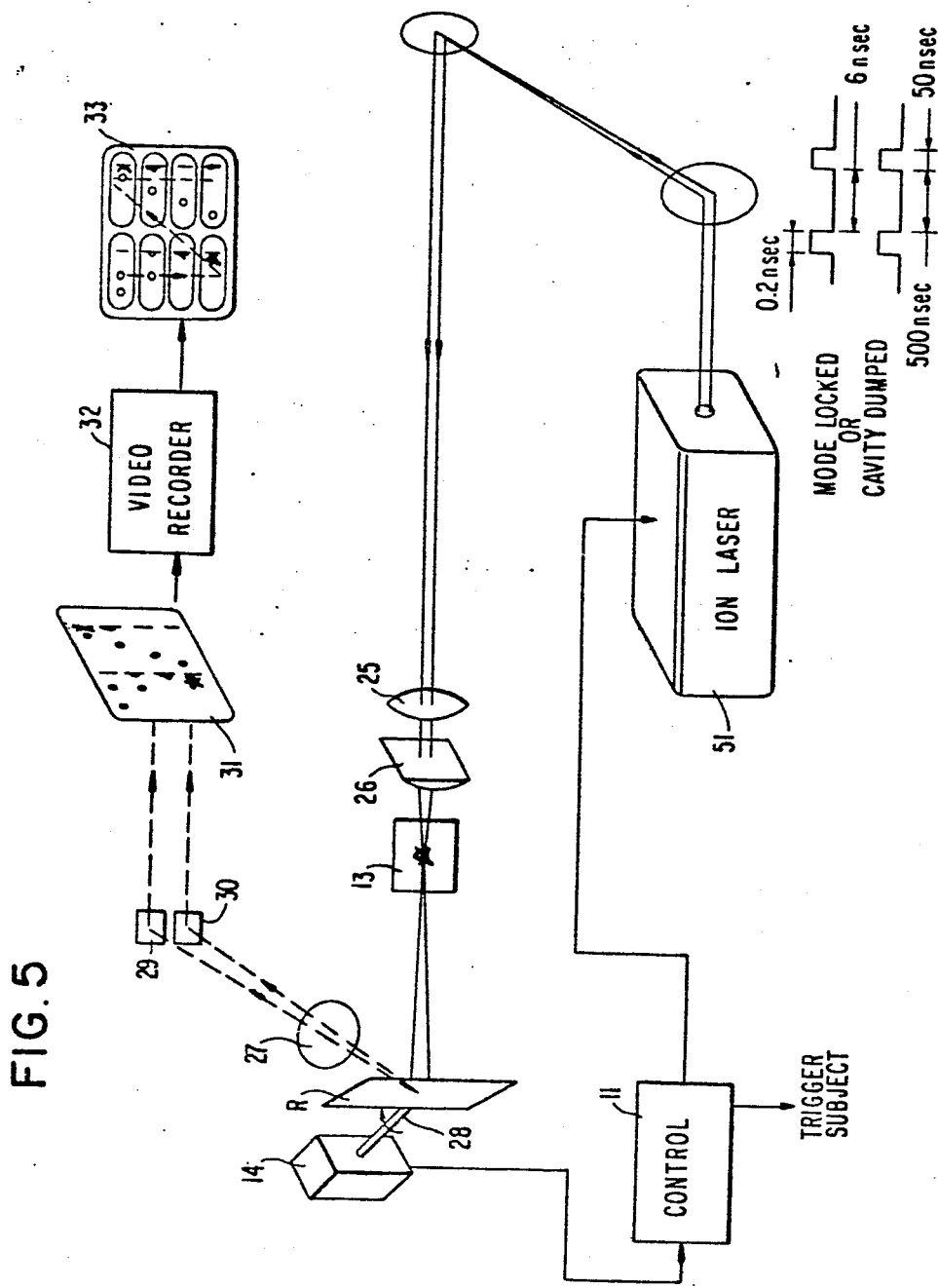

VERSATILE MICROSECOND MULTIPLE FRAMING CAMERA

FIELD OF THE INVENTION

The present invention relates to devices for recording visual images, and more particularly, images of events whose time duration may be on the order of microseconds.

BACKGROUND OF THE INVENTION

In many fields of endeavor, the ability to record visual images plays a significant part. Prior art devices for recording visual images are available in the form of devices which employ photographic film, and electronic devices for recording visual images such as the conventional TV camera, or more precisely, a vidicon tube, for example.

Essential to the production of a useful visual image is sufficient illumination intensity. The advent of the laser, with its intense output, has enabled the recording of events whose time duration is in the microsecond range, or less.

Some examples of visual recording devices employing laser illumination sources include Armstrong et al, U.S. Pat. No. 3,445,167; Guillet et al, U.S. Pat. No. 3,643,568; McCall, U.S. Pat. No. 3,485,159; and some of the cameras described in Huston's "High-Speed Photography and Photonic Recording" appearing in *J. Phys. E:Sci. Instrum.* Vol. 11, 1978, pages 601–609.

These and other prior art cameras employ a variety of techniques to record information on a visual record. For example, Huston discusses framing photography which produces one or more two-dimensional images of the subject, a species of framing photography is entitled multiple framing photography where a short sequence of two-dimensional images is recorded in such a way that it is not possible to project the result as a conventional movie-type presentation. He also discusses the conventional movie-type photography which produces a sequence of two-dimensional images so that projection can take place at a slower rate. In addition, streak photography dispenses with one spatial dimension and records, without interruption, the time variations of the image with respect to a single dimension only. Another technique employed in photography in general as well as in microsecond photography, is stroboscopic photography in which multiple images of a subject undergoing a periodic process are recorded at the same relative time into the process. Each of these techniques carries with it different requirements for illuminating the subject, processing the illumination from the subject and recording the same. Depending upon the particular type of equipment used to record the image, various changes must be made to adapt the equipment to operate under the different regimes.

Furthermore, and especially significant in microsecond photography, is the necessity for the equipment to be precisely timed with respect to the events sought to be recorded. The changes necessary in the recording equipment to effect this precise timing, for photographing different events or different occurrences of similar events, requires more or less effort depending upon the particular equipment employed, and the techniques that equipment employs to record the image.

It is one object of the present invention to provide a camera capable of effecting microsecond photography which is not only versatile in that essentially the same equipment can be employed to generate multiple framing photography, streak photography and stroboscopic photography, but is also relatively simply to alter from one regime to the next. It is another object of the present invention to provide a microsecond photography camera which is easily adjustable to capture precisely the images sought to be recorded, when those images may exist for time durations on the order of a microsecond, or less. It is another object of the present invention to provide a microsecond photography camera which is relatively simply to adjust in that the parameters whose adjustment is required to achieve the desired result, are easily controlled. These and other objects are met in accordance with the invention which will now be described below.

SUMMARY OF THE INVENTION

In accordance with the invention, a microsecond multiple framing camera includes an intense, switched source of illumination, a lens system for focusing the illumination on the subject, a mechanical or electromechanical scanner for redirecting illumination from the subject to sweep over a field as a function of time so as to distribute multiple images over the field, and an illumination recording device located in the field in which the illumination is swept by the mechanical scanner for recording illumination. A control device for driving the switched source at a selected duty cycle and repetition rate is gated on in response to the position of the electromechanical scanner. The duty cycle and repetition rate may be operator-selected parameters to determine exposure time and the number of frames in each field.

More particularly, the switched high intensity illumination source may comprise a laser and an acousto-optic modulator. With the laser continuously energized, operation of the modulator can produce a switched illumination beam. Conventional acousto-optic modulators now available allow the modulator to go from an off state to an on state and back to the off state in 0.1 μs. The electromechanical scanner may comprise a galvanometer or resonant electromechanical scanner which comprises an electromechanical coil driving a reflector such that as the reflector is driven, illumination from the subject is caused to sweep over a predetermined field in space. The recording device is located in the field of space through which the illumination from the scanner is swept, and that device may comprise a vidicon tube for short term storage (i.e., on the order of 17 milliseconds) of an image coupled to a video recorder for long term storage of the image.

Proper inter-relationship between the exposure time which is determined by the on state of the acousto-optic modulator, the velocity of the scanner, and the area of the field through which it scans enables multiple framing photography to take place. More particularly, the acousto-optic modulator control is gated on at a convenient time, such as when the scanner is in a position to reflect illumination to a predetermined portion of the field. The acousto-optic modulator control turns the modulator on for a selected time duration, selected so that the on time is short relative to the velocity of the scanner to, in effect, "freeze" the image, thus, creating a frame or distinct image of the event. The acousto-optical modulator is then disabled for a sufficiently long time so that when it is again enabled, the scanner has moved through a sufficient angle so that a second image can be recorded in the field at a location displaced from the recording location of the first image. The acousto-optic modulator is then enabled for an equivalent short period of time to again "freeze" the second image. Preferably, the inter-frame time, that is, the time during which the acousto-optic modulator is off, is at least 10 times the duration of each exposure, which is determined by the time during which the acousto-optic modulator is on. The inter-frame time can, of course, be much larger than the exposure time, depending on the desired result. For example, the inter-frame time can be 1000 μsec.

The control device for controlling the acousto-optic modulator can comprise simple electronic gating and time delay circuits whose parameters are easily varied by an operator to achieve the precise timing of the camera required for this type of photography, as well as for altering the photography technique employed from multiple framing to streak or stroboscopic. In addition to controlling the acousto-optic modulator, the control device can either respond to scanner position, or actually control scanner movement itself depending upon the particular events sought to be recorded.

To assist the operator in adjusting the various parameters, video monitor may be employed in connection with the video recorder so that, essentially, "real time" information is available to the operator with respect to the accuracy of his adjustments in order to achieve the desired effects. A video monitor may be replaced by a simple viewing screen and appropriate optical components to throw a representation of the image onto the screen to assist the operator. In addition, the entire vidicon/recorder/monitor can either be replaced or supplemented with photographic film and the necessary optical components to throw an image of the subject on the film plane to obtain higher resolution than that which is possible with the vidicon.

For the purpose of this application, the phrase "microsecond camera" should be understood to include a camera capable of capturing images whose duration is on the order of 1 μsec or less, although the camera has applications in which the images capaured may be of longer duration, as is explained below.

In view of the foregoing, it should be apparent that one aspect of the invention includes a versatile camera for recording plural frames of an image in which is readily controlled and in which the camera includes:

a switched laser source means for producing a switched beam of illumination, focusing means for focusing the illumination on a subject, mechanical scanner means for redirecting illumination from the subject to sweep over a field, illumination recording means located in the field for recording illumination from said mechanical scanner means, and control means responsive to said mechanical scanner means for controlling said switched laser source means,

BRIEF DESCRIPTION OF THE DRAWINGS

In the accompanying figures, like reference characters identify identical apparatus

FIG. 5 is a part block, part schematic diagram of another embodiment; and

DETAILED DESCRIPTION OF PREFERRED EMBODIMENTS

Figure 1:
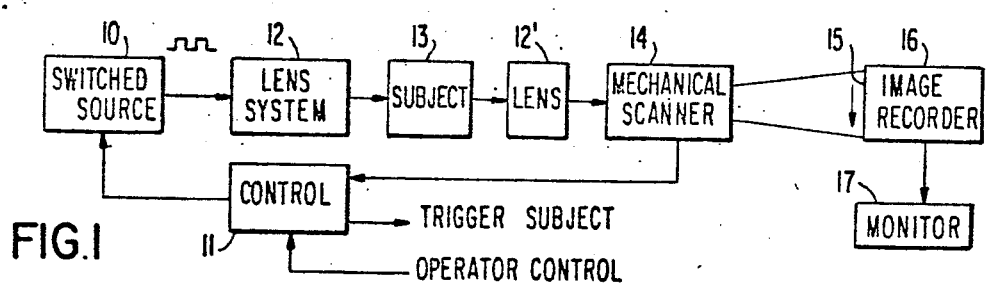
FIG. 1 is a block diagram of the inventive camera.

FIG. 1 is a block diagram illustrating the inventive microsecond camera. As shown in FIG. 1, a switched light source 10 produces an intense beam of illumination which is switched on and off by a control device 11. Both the duration of the on time of the illumination beam, as well as the off time, are controlled, for reasons which will appear hereinafter. A lens system 12 focuses the beam onto a subject 13. Illumination from the subject 13 is passed through objective lens 12' and is directed to a mechanical scanner 14. Operation of the mechanical scanner causes the illumination from the subject 13 to scan a field 15. An image recorder 16 is provided for retention of the image painted on the field 15 by operation of the scanner 14. In addition, and desirably, a monitor 17 may respond to the image recorder 16 so as to provide the operator with substantially an instantaneous image of the recorded image. In order to coordinate the on times of the switched source 10 with the position of the scanner 14, the control device 11 responds to the scanner 14 in order to control the on periods of the illumination source 10. In those cases where the subject to be viewed undergoes a short term process, the control 11 may also provide a signal to trigger the subject process. For example, the inventive camera has been used to record ink droplets, from an ink jet printer, striking a surface. Thus, the trigger signal can be used to start the process of emitting ink from the printer. The operator can intelligently operate the control device 11 by viewing the results of previous operations on the monitor 17.

Figure 2A:
FIGS. 2A and 2B show light pulses and scanner deflection as a function of time.
Figure 2B:
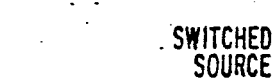

FIG. 2 illustrates one desirable relationship between scanner position and operation of the switched source. In FIG. 2A, scanner position is plotted as a function of time. At any instant of time, the position of image in the field 15 is determined by the position of the scanner 14. Accordingly, the switched source 10 is controlled to produce a periodic stream of illumination beams, or a pulsed beam, at a controlled repetition rate, and with a controlled delay between individual pulses as shown in FIG. 2B. For each illumination beam, A through K, for example, occurring during a single sweep of the scanner 14, a different image of the subject 13 will be produced in the field 15, and since the different illumination pulses from the source 10 are time displaced, so, too, will the various images be space displaced in the field 15 so that each is separately viewable in a predetermined order. While the scanner motion can be of the triangular waveform shown in FIG. 2A, that is not essential to the invention, so long as a portion of scanner motion is of the form shown in FIG. 2A. While FIG. 2A illustrates that scanner position is a linear function of time, for at least the portion of the scanner movement illustrated, that is only a desirable goal and not essential to the invention. The displacement between adjacent illumination beams or pulses must be sufficiently long, in connection with the scanner movement, so that images produced by the respective beams will be spatially displaced in the field so that they can be independently viewed.

Several other constraints are imposed upon the form of the switching waveform. Namely, the on time of the source, when considered in connection with the intensity of the source, must provide for sufficient energy so that the recording device can respond. At the same time, the on time must be sufficiently short, when considered in connection with the velocity of the scanner 14, so that image smear is not produced, i.e., the on time should be short enough to "freeze" any motion occurring in the subject 13. Finally, the displacement between adjacent illumination pulses, considered in connection with the velocity of the scanner 14, must be sufficiently great so that the images produced on the field 15 will not overlap.

In a preferred embodiment of the invention, the source comprises a helium neon laser (although obviously other lasers could also be employed) and in one experiment, the on time of the illumination pulse was on the order of 1/10th of a microsecond. The off time of the source is preferably at least 10 times the on time, although the only upper limit on the off time is a desire to record several images during the time of a single scan of the field 15 by the scanner 14. Thus, for example, the inter-frame time could vary from 1 to $10^3$ μsec., and with a time for exposing an entire field varying from 3 to about $10^5$ μsec. with as few as 3 to 100 images or frames per field.

Figure 3:
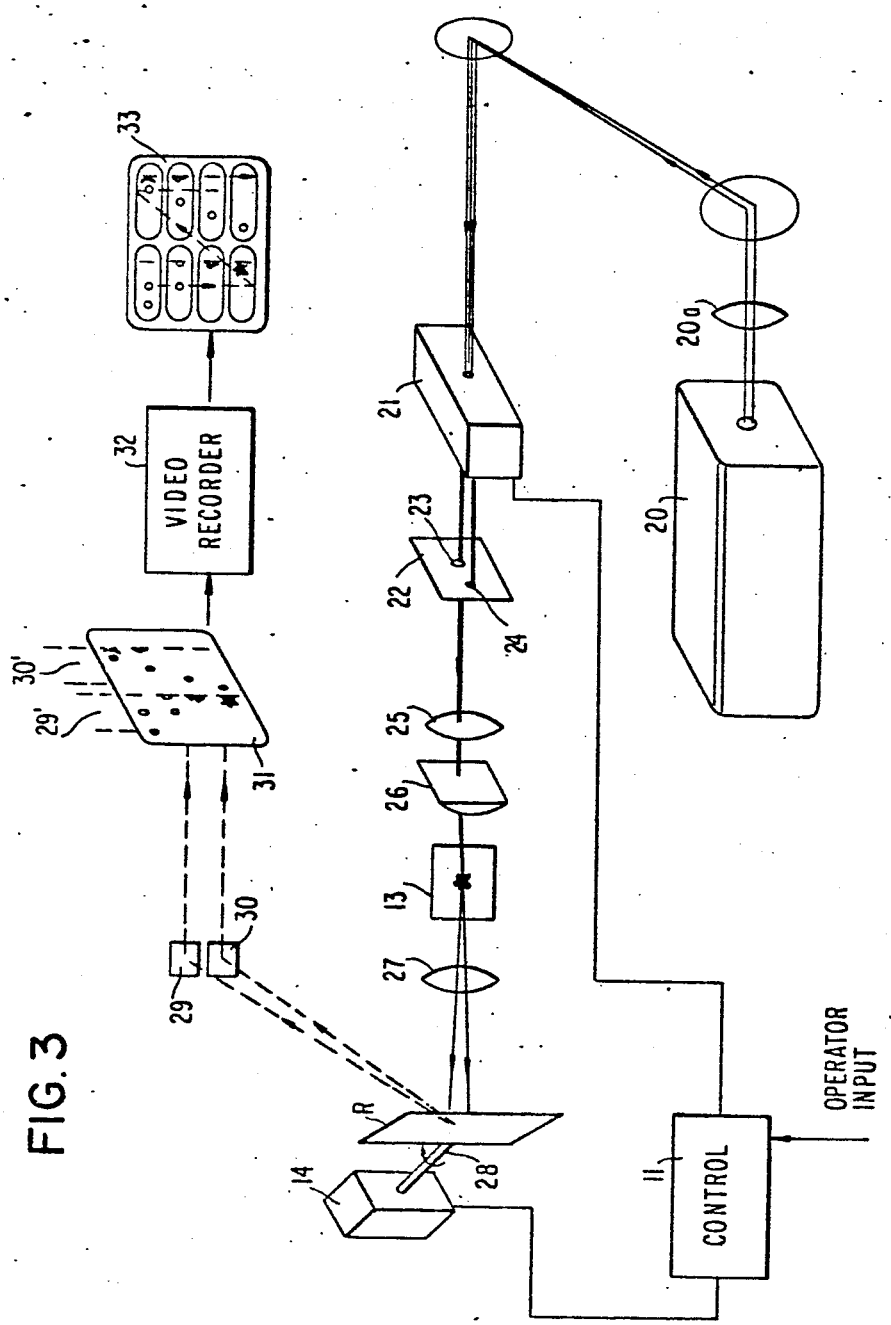
FIG. 3 is a part block, part schematic diagram of a preferred embodiment.

FIG. 3 is a schematic illustration of a preferred embodiment. As shown in FIG. 3, the output of a helium neon laser 20 impinges on an acousto-optic modulator 21. The beam passes through the acousto-optic modulator 21 but the position of the beam at an aperture 22 determines whether or not the illumination will pass the aperture 22. Thus, for example, when the acousto-optic modulator is driven on by an electric signal, the beam is displaced to pass a first order maximum through an aperture 23; when the acousto-optic modulator 21 is not driven, the beam is blocked by the light block at 24. Accordingly, driving the acousto-optic modulator 21 produces an illumination pulse which terminates when the acousto-optic modulator 21 is not driven. In the preferred embodiment of FIG. 3, the lens system 12, 12' comprises condenser lenses 25 and 26 and an objective lens 27 forming an open-air microscope. In the referred to ink jet experiment, the condenser lenses 25, 26 were selected to give a cigar-shaped image (longer than wide) on the field 31 by use of a cylindrical element. The lenses 25 and 26 focus the illumination pulse on a subject 13 and the illumination from the subject 13 passes through the objective lens 27 where it strikes a reflector R of the scanner 14. To ensure adequate response of the modulator (i.e., less than 0.4 μsec.), the lens 20a is of a 1 m. focal length so beam diameter is much less than 1 mm. The reflector R is driven by the scanner 14 to describe cyclical movement about its axis 28. The scanner 14 provides a signal to the control device 11 periodically in the cycle of scanner movement, for example, when the scanner passes a predetermined position or angular displacement from its rest position. The illumination pulse reflected by the reflector R can be imaged directly on a field 15 in which case the images are displaced in one direction as the reflector R moves through its arc. FIG. 3, however, illustrates a technique whereby two displaced series of images can be produced in a single field 15 during a single scan of the reflector R. As shown in FIG. 3, a first mirror 29 is oriented so that illumination pulses reflected by the reflector R during the first portion of its scanning movement result in a vertically displaced series of images in the portion 29' of the field 15. As the reflector R continues its rotation movement in a second portion of its scan, the illumination pulses are directed at a mirror 30, whose orientation is slightly different from the mirror 29. Accordingly, the illumination pulses reflected by the reflector 30, as the reflector R scans the second portion of its cycle, produces another vertically displaced series of images in the portion 30' of the field 15 which another series of images is horizontally displaced from the series of images 29'. Obviously, more than two distinguishable portions of the scan of the reflector R can be selected by multiplying the number of mirrors 29 or 30, at various orientations, so that the field 15 is, in effect, broken up into a like number of portions.

The principle of operation of an acousto-optical modulator is discussed in "Modulators for Optical Communications" by Chen, appearing in *Proceedings of the IEEE*, Vol. 58, pages 1440–1447 (October 1970); H. V. Hance and J. K. Parks—"Wide Band Modulation of a Laser Beam, Using Bragg-Angle Diffraction by Amplitude-Modulated Ultra-Sonic Wave" in the *Journal of Acoustical Society of America*, Vol. 38, pages 14–23, July 1965; and, D. Mayden "Acoustico-Optical Pulse Modulator" in the *IEEE Journal of Quantum Electronics*, Vol. QE-6, p. 15–24, January 1970. As employed in the inventive camera, the modulator 21 is arranged to pass illumination from the the laser into a light block 24 when the modulator is not energized. When a pulse from control 11 is received, the modulator 21 deflects the beam to pass a first order maximum through aperture 23. The modulator should result in a black/white ratio of at least $10^2$, although at least $10^3$ or $10^4$ is preferred.

Electromechanical scanners are actually commercially available devices from either Electronics Division of Bulova Watch Company, Inc., Woodside, N. Y., or General Scanning Corporation, Watertown, Massachusetts. Of the commercially available devices, those suitable for use in the inventive camera are either of the galvanometer or resonant type. In the former, a galvanometer type movement is arranged to rotate a reflector, feedback circuitry provides excellent linearity between the driving waveform and reflector deflection. The reflector can be deflected up to 60° peak to peak, and the driving frequency can be in the range between zero and 25 kHz., usually, however, as the frequency of the driving function is increased, the arc through which the reflector is driven decreases. Typical resonant devices mount the reflector either on a torsion rod or a taut band, and depending on the type of mounting, may achieve up to 30° peak to peak deflection, at frequencies from very low to more than 20 kHz., although as the frequency is increased, the deflection angle is reduced.

Figure 6:
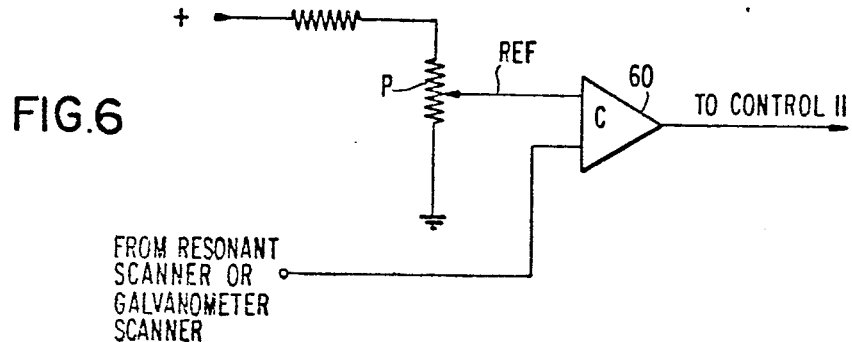
FIG. 6 is a schematic showing generation of the scanner position signal.

Because of the linearity in galvanometer rotation and driving waveform, the driving waveform itself can be used as an indication of scanner position. A simple comparator (60 in FIG. 6) is arranged to emit a pulse at the desired point in the waveform, which can be selected by merely selecting the reference input (Ref.) to the comparator 60 by appropriately positioning the potentiometer P.

Resonant scanners have a pick-up coil from which a signal related to scanner position is available. With a suitable comparator 60, a pulse or spike can be generated when the scanner is in a position corresponding to the reference signal.

In the ink jet experiment referred to, the effective distance from scanner to vidicon was about 30", so the 1" vidicon screen was covered by scanner rotation through 0.9° resulting in the beam being swept across 1.8°. In the same experiment, the delay used by a delay circuit 34 was 100 μsec. with a 0.1 μsec. exposure and a 10 μsec delay between pulses, so that 10 frames were produced 100–200 μsec after the ink jet was triggered.

As shown in the embodiment of FIG. 3, the image recording device 16 comprises a vidicon tube or the like 31, a video recorder 32 with a stop action capability, responsive to the vidicon tube 31 and optionally, a television monitor 33 responsive to the video recorder 32. FIG. 3 shows the monitor 33 with two vertically displaced sets of four images.

Typically, the vidicon tube 31 (or other equivalent TV camera) will read out its screen every 17 ms., although it is capable of storing images for up to ~1 sec., if not read. Even when read, the image is not erased, but only reduced in intensity. Thus, the vidicon is essentially a short term storage device which can easily store multiple images (2–60 or more) each time displaced from its neighbor by $1-10^3$ μsec. until it is read out for permanent recording. While the video recorder 32 can use a tape medium, conventionally, resolution is diminished. Storage without degradation in resolution can be effected by using a digital storage with a disk medium. Usually, ambient light is not a problem, but if high intensity room light must be tolerated, a 6328 Å interference filter can be placed in front of the vidicon.

Figure 4:
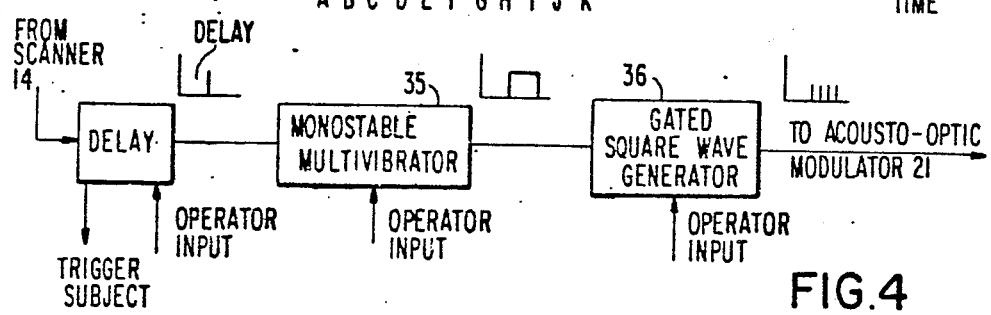
FIG. 4 is a block diagram of an element of the inventive camera.

FIG. 4 illustrates the control device 11. As shown in FIG. 4, the scanner position indicating signal is provided as an input to an operator adjustable time delay circuit 34. One output of the time delay circuit 34 is a short pulse delayed from the input by the operator selected amount. This is coupled to a pulse stretching circuit 35 which may comprise an operator controlled monostable multivibrator. The output of the pulse stretching circuit comprises a pulse beginning at the time of the input, and having a duration selected by operator control. The output of the pulse stretcher 35 is coupled to a gated squarewave generator 36. The output of the gated squarewave generator 36 is a series of pulses of predetermined duration and repetition rate, the entire series of which is gated by the output of the pulse stretcher 35. The output of the gated squarewave generator 36 is coupled to the acousto-optical modulator 21, wherein each pulse represents an on state of the modulator, and the off period of the pulses relate to the off state of the modulator. The other output of the time delay 34 is an undelayed spike which can be used to trigger the subject. Although the control device 11 can be built of off-the-shelf components, the delay 34 and pulse stretcher 35 can comprise, respectively, the "A" and "B" time bases of a Mod 545 Tektronix oscilloscope, which is commercially available.

In typical operation, each pulse from the gated sqaure-wave generator is on for 0.1 microseconds, the delay between pulses can be anywhere from 1 to 1000 microseconds or more. A typical vidicon tube is "read" every 17 milliseconds in interlaced fashion so that two consecutive video fields correspond to a video frame; and the frame has a duration of about 34 milliseconds.

Assume that a subject sought to be recorded exhibits motion which is of interest over a period of 500 microseconds, at some undefined but repeatable time in the range of 100 to 2500 microseconds after it is energized. The inventive camera can be used to capture a sequence of images in the range of 3 to 64, for example, existing over the duration of the 500 microseconds of interest, in the following fashion.

The scanner is initiated into motion which has a linear or quasi-linear displacement as it sweeps illumination from the subject over the field. The arc through which the scanner swings, the distance to vidicon 31 and the presence of reflectors in that path are selected so the linear or quasi-linear swing of the scanner covers the active area of the vidicon 31. The operator selects the delay provided by the delay circuit 34 somewhere in the range of 100 to 2500 microseconds, selects the period of the pulse stretcher to be 500 microseconds and selects the period between the pulses provided by the sqaurewave generator so that the off time is equally distributed between the number of frames that are to be recorded in the 500 microsecond period. For example, if 50 frames were to be recorded, the off period would be selected as about 10 microseconds. The subject sought to be photographed is then energized or released and the resulting image is examined on the monitor. Since the operator can only "capture" a 500 microsecond time slice, the time slice actually captured may be either before, after, or partially overlapping the subject's activity of interest. By adjusting the delay provided by the delay circuit 34, the operator can zero in on the desired time slice. In the alternative, the period of the pulse stretcher 35 can be selected to cover an entire video frame, i.e., 35 milliseconds. In this case, while very little video information will be obtained, since the entire activity of interest will be compressed into 1/7th of the video frame (i.e., 3500 divided by 500) the location at which it appears will provide an operator with information as to what the delay of the delay circuit 34 should be to properly photograph the activity desired. In this fashion, the operator can rapidly and precisely select the desired parameters of the camera so as to view in an optimum fashion the activity of interest.

The foregoing discussion has assumed that the image sought to be recorded employed transmitted light so that the image actually recorded corresponds to a silhouette type record. However, that is not essential to the invention, and by merely varying the relative locations of the scanner and the subject, scattered light could be employed to create the image for recording. A particular difficulty with scattered light photography is the low collection efficiency of the objective lens. For example, using transmitted light photography, a 1 milliwatt helium neon laser produces acceptable results at exposure durations of 3/10ths of a microsecond or greater. If the same 1 milliwatt laser is to be used for scattered light photography, the exposure time should be increased to be greater than 10 microseconds, and correspondingly, the inter-frame time should be lengthened to at least 100 microseconds. In the alternative, however, by increasing laser power, for example, to the 0.1 to 1 watt range (corresponding to the use of an ion laser) the exposure time of 0.1 microseconds can be maintained. Intermediate values would be to employ a 10 milliwatt laser, use an exposure time of about 1 microsecond and inter-frame times of about 10 microseconds.

The present camera can also be employed to produce streak photography by firstly using a slit at the microscope entrance (i.e., before the condenser lens) as in conventional in streak photography, and by lengthening the on time of each pulse in the gated squarewave generator to correspond to the desired streak length. At one extreme, the streak length could correspond to an entire scan of the field and the gated squarewave generator would produce a single pulse.

Likewise, stroboscopic photography can be practiced by fixing the position of the scanner (i.e., turning off the drive) and triggering the gated squarewave generator 36 in synchronism with the subject sought to be photographed. More particularly, the trigger output of delay 34 or the delayed output of delay 34 can be used to trigger the squarewave generator, i.e., bypass the pulse stretcher 35.

Although the use of TV techniques is well suited to the inventive camera because of its almost "real-time" response, for increased resolution photograph film can be used. A film holder can be located either in the field 15 after the timing has been adjusted or a beam splitter or mirror added to provide a second field in which the image is painted on a photographically responsive film. Of course, film speed, exposure time and illumination intensity will have to be selected to provide optimum images.

While the ability of the inventive camera to capture microsecond images has been emphasized, it should be understood that slower rate images may also be recorded. For example, by increasing inter-frame time to 2000 μsec. a series of 16 images can be recorded on each video frame with exposure durations up to about 200 μsec.

At the other extreme, even shorter exposure times can be produced by replacing the continuous laser-acousto-optic modulator with an ion laser and cavity dumper 51 as shown in FIG. 5. These provide a higher power (10 w) and shorter pulse duration (~50 nsec.) so that inner-frame times of 0.5 μsec. can be used. Still shorter pulses can be generated in a mode locked ion laser. A commercial mode locked ion laser has pulse durations of 0.2 nsec. separated by 6 nsec. For the inventive camera, the 6 nsec. inter-frame time requires scanner deflection to be adequate in 6 nsec. to separate the images. Sufficiently fast deflection can be obtained with a high frequency resonant scanner which is commercially available at about 30 kHz with velocities of $2 \times 10^4$ rad/sec. In 6 nsec. a deflection of $10^{-4}$ rad is produced. By locating the scanner 14 between objective 27 and subject 13 and using a 10 power objective, effective angular displacement of $10^{-3}$ rad is obtained resulting in image displacement of 1 mm. (at 1 meter). This is sufficient to distinguish adjacent frames. FIG. 5 illustrates the inventive camera with scanner between subject 13 and objective 27 as discussed above. The control device 11 is now required to produce a train of pulses at 6 nsec. spacing to trigger the laser 51. Similar results are more easily obtained with the cavity dumped ion laser with 0.5 μsec. pulse spacing since the angular displacement (at $2 \times 10^4$ rad/sec) is $10^{-2}$ rad. Accordingly, the objective 27 can be located before scanner 14 or a slower scanner rate can be used.

What is claimed is:

1. A versatile microsecond camera for recording plural frames of an image which is readily controlled comprising:
   switched laser source means (10) for producing a switched beam of illumination;
   focusing means (12) for focusing said switched illumination beam on a subject;
   mechanical scanner means (14) for redirecting illumination from said subject to sweep over a field (15);
   illumination recording means (16) located in said field for recording illumination from said mechanical scanner means; and
   control means (11) responsive to said mechanical scanner means for controlling said switched laser source means.

2. The apparatus of claim 1 werein said switched laser source means comprises:
   a continuous output laser (20), and
   switching means (21-24) in the path of said output for alternately passing and blocking said output in response to said control means.

3. The apparatus of claim 2 in which said switching means comprises an acousto-optic modulator (21) in the path of said illumination, and
   an aperture (23) located in one of two possible paths of illumination from said acousto-optic modulator and an illumination block (24) in another of said two possible paths,
   whereby illumination on said one path passes through said aperture and illumination on said another path is blocked.

4. The apparatus of claim 1 wherein said mechanical scanner means comprises:
   a resonant electro-mechanical scanner (14) with a reflector (R) for redirecting illumination from said subject, and
   signal generating means (60) for generating an electrical signal when said reflector achieves a predetermined angular position.

5. The apparatus of claim 1 wherein said mechanical scanner means comprises:
   a galvanometer electro-mechanical scanner (14) with a reflector (R) for redirecting illumination from said subject, and
   signal generating means (60) for generating an electrical signal when said reflector achieves a predetermined angular position.

6. The apparatus of claim 1 wherein said mechanical scanner means includes a reflector (R) swept through an angular movement, and signal generating means (60) for generating an electrical signal corresponding to a predetermined position of said mechanical scanner means and in which said control means includes:
   time delay circuit means (34) responsive to said electrical signal for delaying said signal,
   pulse stretcher means (35) coupled to said time delay circuit means for delivering a gate signal initiated by said delayed electrical signal and terminated a selected period after initiation,
   a gated squarewave generator (36) responsive to said gate signal for producing a train of pulses of predetermined duration and repetition rate, and
   coupling means for coupling said train of pulses to said switched laser source means.

7. The apparatus of claim 6 in which said switched laser source means comprises:
   a continuous output laser (20),
   an acousto-optic modulator (21) located to receive a beam of illumination from said laser for directing said beam on one of two paths,
   said coupling means coupled to said acousto-optic modulator, and
   an aperture (23) located in one of said two paths and an illumination block (24) in said other of said two paths, whereby said laser illumination passes said aperture only when said illumination is directed on said one of said two paths.

8. The apparatus of claim 1 wherein said image recording means comprises:
an image storage tube (31) located in said field, and
video recorder means (32) coupled to said image storage tube for periodically permanently recording images from said image storage tube.

9. The apparatus of claim 8 which further includes a video monitor (33) coupled to said video recorder means for displaying images from said video recorder means.

10. The apparatus of claim 8 wherein said image storage tube comprises a vidicon tube.

11. A versatile sub-microsecond camera capable of capturing images of sub-microsecond duration comprising:
ion laser means (51) emitting a pulsed illumination beam of duration less than 100 nsec.,
microscope means (25, 26) for focusing said pulsed illumination beam on a subject,
a resonant mechanical scanner (14) and a reflector (R) driven thereby located in a path of illumination from said subject,
a lens (27) for magnifying illumination reflected by said reflector,
and image recording means (31, 32) for recording an image located in a path of illumination from said lens.

12. The apparatus of claim 11 wherein said image recording means includes a vidicon tube (31) coupled to a video recorder (32).

* * * * *